US009542209B2

(12) United States Patent
Davis et al.

(10) Patent No.: US 9,542,209 B2
(45) Date of Patent: Jan. 10, 2017

(54) PRESERVING USER PROFILES ACROSS REMOTE DESKTOP SESSIONS

(75) Inventors: Scott Howard Davis, Needham, MA (US); Daniel Beveridge, Apollo Beach, FL (US); Jonathan Clark, San Francisco, CA (US); Blake Watts, St. George, UT (US)

(73) Assignee: VMware, Inc., Palo Alto, CA (US)

( * ) Notice: Subject to any disclaimer, the term of this patent is extended or adjusted under 35 U.S.C. 154(b) by 50 days.

(21) Appl. No.: 13/539,148

(22) Filed: Jun. 29, 2012

(65) Prior Publication Data

US 2014/0006346 A1   Jan. 2, 2014

(51) Int. Cl.
- G06F 7/00 (2006.01)
- G06F 17/00 (2006.01)
- G06F 9/445 (2006.01)
- G06F 9/44 (2006.01)

(52) U.S. Cl.
CPC .......... *G06F 9/4451* (2013.01); *G06F 9/4445* (2013.01)

(58) Field of Classification Search
CPC ... G06F 9/4451; G06F 9/4445; H04N 7/17318
USPC .......... 707/609, 913, 657, 658, 672
See application file for complete search history.

(56) References Cited

U.S. PATENT DOCUMENTS

| | | | |
|---|---|---|---|
| 8,725,791 B2 * | 5/2014 | Nord et al. | 709/202 |
| 2002/0138279 A1 * | 9/2002 | Al-Kazily | G06Q 30/02 709/203 |
| 2005/0198239 A1 * | 9/2005 | Hughes | 709/222 |
| 2008/0209351 A1 * | 8/2008 | Macadaan et al. | 715/762 |
| 2008/0244028 A1 * | 10/2008 | Le et al. | 709/208 |
| 2009/0064000 A1 * | 3/2009 | Garbow et al. | 715/762 |
| 2010/0107158 A1 * | 4/2010 | Chen et al. | 718/1 |
| 2011/0179139 A1 * | 7/2011 | Starkenburg et al. | 709/217 |
| 2011/0251992 A1 * | 10/2011 | Bethlehem et al. | 707/610 |
| 2012/0072898 A1 * | 3/2012 | Pappas et al. | 717/171 |
| 2012/0173731 A1 * | 7/2012 | Lin et al. | 709/226 |
| 2012/0226742 A1 * | 9/2012 | Momchilov et al. | 709/203 |
| 2012/0272236 A1 * | 10/2012 | Baron | 718/1 |
| 2013/0061284 A1 * | 3/2013 | Berengoltz | G06F 21/51 726/1 |

* cited by examiner

*Primary Examiner* — Md I Uddin

(74) *Attorney, Agent, or Firm* — Patterson & Sheridan LLP

(57) ABSTRACT

User profiles of remote desktops are managed in a crash-consistent manner. When a user logs into a remote desktop, metadata of the user profile is loaded from persistent storage while registry settings and files of the user profile are loaded asynchronously with respect to the login. During the remote desktop session, snapshots of the remote desktop image in persistent storage are generated periodically, and a change log that indicates changes to the user profile is created therefrom. The user profile stored in persistent storage is updated lazily using the change log at opportunistic times after snapshot generation. When the user logs out of the remote desktop, the user profile stored in the persistent storage is updated with any additional changes to the user profile by extracting the changes from the copy-on-write cache associated with the most recent snapshot.

19 Claims, 4 Drawing Sheets

PRESERVING USER PROFILES ACROSS REMOTE DESKTOP SESSIONS

BACKGROUND

Server-based computing allows a networked client computer, which may be remotely situated with respect to a server, to access computing resources on the server. Several protocols, such as Remote Desktop Protocol (RDP), Virtual Network Computing (VNC), or PC over IP (PCoIP), have been developed to enable server-based computing. Increasingly, server-based computing has become supported by a virtualized computing environment. One such example is virtual desktop infrastructure (VDI), which enables organizations to replace traditional personal computers (PCs) on the client side with instances of a desktop operating system that are hosted on virtual machines running on servers in a data center. A thin client that is installed on a user's terminal remotely connects to one of the virtual machines running the desktop operating system and presents a "virtual desktop" for the user.

In order to allow users of server-based computing to retain customizations of their desktops and provide them with a consistent desktop experience, various user profile management solutions, sometimes referred to as "persona management," have been developed. One such solution is user profile backup and restore. With this solution, the user profile is saved to persistent storage when the user logs out and restored from the persistent storage when the user subsequently logs in. This solution, however, has some limitations. The first is a spike in input-output operations (IOs) during popular login and logout times, such as at the beginning and at the end of a work day. Second, the login and logout processes are delayed as the user must wait for his or her profile to be loaded into memory upon login and to be saved to persistent storage upon logout. Third, the solution relies on the user to logout to trigger an update of the user profile. Some users, however, do not always logout after completing a remote desktop session. In such cases, the user loses any changes to the user profile if the server hosting the remote desktop session should crash. Also, if the user launches another remote desktop session, the original user profile will be restored onto the desktop and the user will now have inconsistent user profiles across different remote desktop sessions.

To overcome the drawbacks of the user profile backup and restore techniques, a user profile streaming technique has been developed by VMware, Inc. of Palo Alto, Calif. According to this technique, when a user logs into a remote desktop session, the basic components of the user's profile are first loaded. Other components of the user's profile are subsequently loaded on an as-needed basis, e.g., as they are accessed by the user. In addition, the user profile is updated in persistent storage as the components of the user profile are being updated during the remote desktop session. As a result, IO spikes are avoided and the login and logout processes take less time.

SUMMARY

One or more embodiments of the present invention provide a method for managing user profiles that employ user profile streaming techniques and, in addition, preserve user profiles in persistent storage on a crash-consistent basis. In one embodiment, the method also dynamically creates stateless desktops in a shared storage system to allow the user to preserve his or her desktop experience across multiple desktop sessions even though they are hosted on different machines.

A method of preserving user profiles for desktops across desktop sessions, according to an embodiment, includes the steps of generating a snapshot of the desktop, extracting a differential state of the user profile based on the snapshot to create a change log of the user profile, and "lazily" (i.e., asynchronously with respect to the generation of the snapshot and the creation of the change log) committing changes indicated by the change log to the user profile stored in the persistent storage. The steps of generating, extracting, and committing are performed on a periodic basis during a desktop session and, when the user logs out of the desktop session, the changes indicated by the change log that have not yet been committed and any other changes to the user profile since the most recent snapshot are committed to the user profile stored in the persistent storage in response thereto. To permit the user to preserve his or her desktop experience across multiple desktop sessions regardless of the particular machine that is hosting the desktop, the user profile may be stored in a shared storage system, such as a storage area network (SAN) device or a network-attached storage (NAS) device.

Further embodiments include a non-transitory computer-readable storage medium that includes instructions that enable a processing unit to implement the above method as well as a computer system configured to implement the above method.

DETAILED DESCRIPTION

Figure 1:
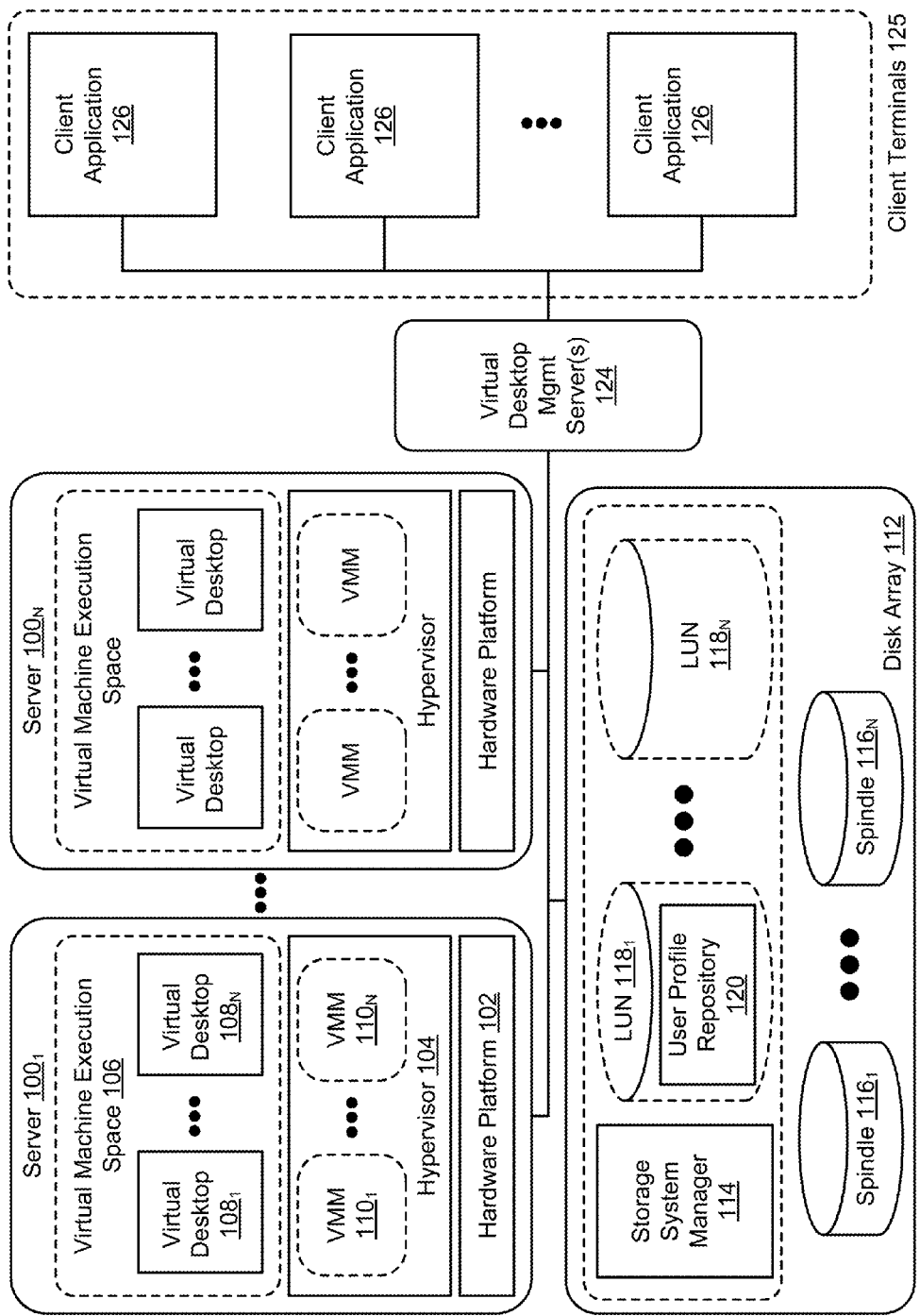
FIG. 1 depicts a block diagram of a data center architecture supporting a virtual desktop infrastructure (VDI).

FIG. 1 depicts a block diagram of a data center architecture supporting a virtual desktop infrastructure (VDI). The data center of FIG. 1 comprises a plurality of servers $100_1$-$100_N$ constructed on server class hardware platform, such as hardware platform 102. As further detailed below, hardware platform 102 may be, for example, an x86 architecture platform that includes a hard drive, network adapter, system memory, processor and other I/O devices such as a mouse, keyboard and the like.

A virtualization software layer, also referred to hereinafter as a hypervisor 104, is installed on top of hardware platform 102. Hypervisor 104 supports a virtual machine execution space 106 within which multiple virtual desktops (i.e., virtual machines running desktop operating systems and applications) may be concurrently instantiated and executed. As shown, virtual execution space 106 includes virtual desktops $108_1$-$108_N$. In one embodiment as further discussed in FIG. 2, for each virtual desktop running on server $100_1$, hypervisor 104 provides a corresponding virtual machine monitor (VMM) $110_1$-$110_N$ that implements virtualization support such as emulated hardware to coordinate operations between hypervisor 104 and the virtual desktop.

Each of servers $100_1$-$100_N$ is further networked to an enterprise-level storage system such as storage array 112. Examples of storage array 112 may be a network attached storage (NAS) array, storage area network (SAN) array, or any other similar storage array. Storage array 112 includes a storage system manager 114 that serves as the communication agent for storage array 112 and implements a virtualization of the physical, typically rotating disk drive-based storage units, referred to in FIG. 1, as spindles $116_1$-$116_N$, that reside in storage array 112. In alternative embodiments, storage array 112 may be implemented using solid-state non-volatile storage media, known as solid-state disks. Storage system manager 114 abstracts away the complexities of targeting read and write operations to the physical addresses of the actual spindles by exposing to servers $100_1$-$100_N$ the ability to view the aggregate physical storage space provided by the spindles as a contiguous logical storage space that is divided into set of virtual partitions known as LUNs (logical units) $118_1$-$118_N$. The embodiment of FIG. 1 depicts LUN $118_1$ maintained by storage array 112 that include a user profile repository 120 that stores user profile data for all users of VDI.

A virtual desktop management server 124 placed between servers $100_1$-$100_N$ and user terminals 125 manages the provisioning of virtual desktops on servers $100_1$-$100_N$ to user terminals 125 and also functions as a connection broker that manages connections between user terminals 125 and virtual desktops 108. In alternative embodiments, a server that provides the functionality of the connection broker may be separately provided. User terminals 125 may execute a "thin client" application 126 that interacts with virtual desktop management server 124 to connect to a user's virtual desktop and render the virtual desktop's graphical user interface. Alternatively, a user terminal may access a virtual desktop through web browser access or through other similar means.

It should be recognized that various modifications and changes may be made to the data center embodiment of FIG. 1 consistent with the teachings set forth herein. For example, servers $100_1$-$100_N$ and may be connected through various different known topologies and technologies (e.g., switches, etc.) to multiple storage systems similar to storage array 112. One alternative embodiment may implement virtual desktop management server 124 as a virtual machine running on one of servers $100_1$-$100_N$. One example of virtual desktop management server 124 that may be used in embodiments is the VMware Virtual Desktop Manager product, which is commercially available from VMware, Inc. of Palo Alto, Calif.

Figure 2:
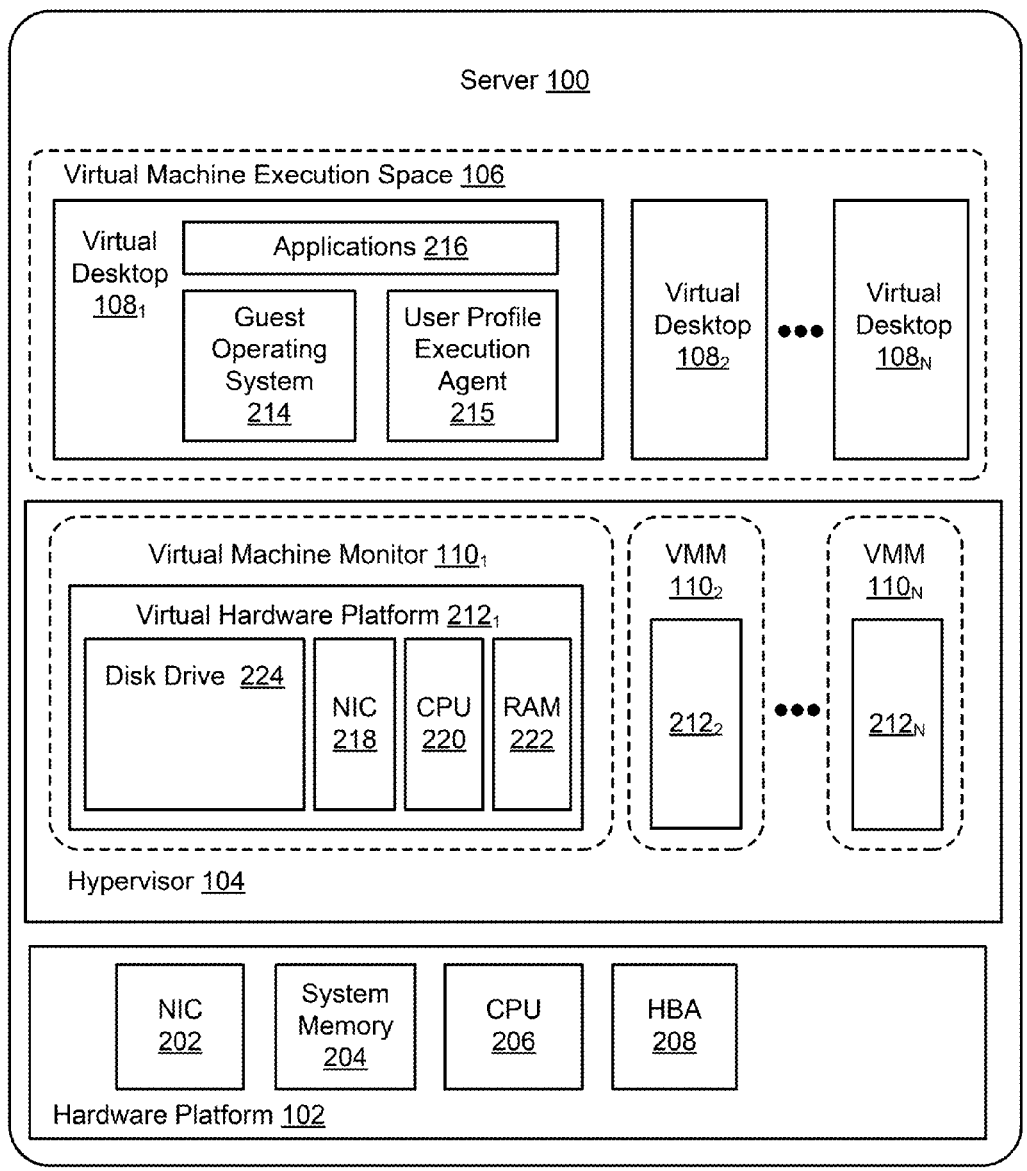
FIG. 2 depicts a block diagram of a server utilizing a virtualization architecture in a data center supporting VDI.

FIG. 2 depicts a block diagram of a server utilizing a virtualization architecture in a data center supporting VDI. As previously discussed in the context of FIG. 1, hardware platform 102 of server 100 may include a network interface controller (NIC) 202, system memory 204, one or more central processing units (CPU) 206, a host bus adapter (HBA) 208 that networks server 100 to storage array 112, and other I/O devices such as, for example, a mouse and keyboard (not shown in FIG. 2). Hypervisor 104, installed on top of hardware platform 102, supports virtual machine execution space 106 within which multiple virtual desktops $108_1$-$108_N$ may be concurrently instantiated and executed. For each of virtual desktops $108_1$-$108_N$, hypervisor 104 implements a corresponding virtual machine monitor (VMM) $110_1$-$110_N$ that includes a virtual hardware platform (i.e., virtual hardware platforms $212_1$-$212_N$) of emulated hardware, such as virtual NIC 218, virtual CPU 220, guest physical RAM 222 and virtual disk 224 for virtual desktop $108_1$. In one embodiment, virtual hardware platform $212_1$ may function as an equivalent of a standard x86 hardware architecture such that any x86 supported desktop operating system, e.g., Microsoft Windows®, Linux®, Solaris® x86, NetWare, FreeBSD, etc., may be installed as guest operating system 214 to execute any supported application in application layer 216. It should be recognized that the various terms, layers and categorizations used to describe the virtualization components in FIG. 2 may be referred to differently without departing from their functionality or the spirit or scope of the invention. For example, virtual hardware platforms $212_1$-$212_N$ may also be considered to be separate from VMMs $110_1$-$110_N$, and VMMs $110_1$-$110_N$ may be considered to be separate from hypervisor 104 or part of corresponding virtual desktops $108_1$-$108_N$. One example of hypervisor 104 that may be used is included as a component of VMware's ESX™ product, which is commercially available from VMware, Inc. It should further be recognized that other virtualized computer systems consistent with the teachings herein are contemplated, such as hosted virtual machine systems, where the hypervisor is implemented in conjunction with a host operating system.

Figure 3:
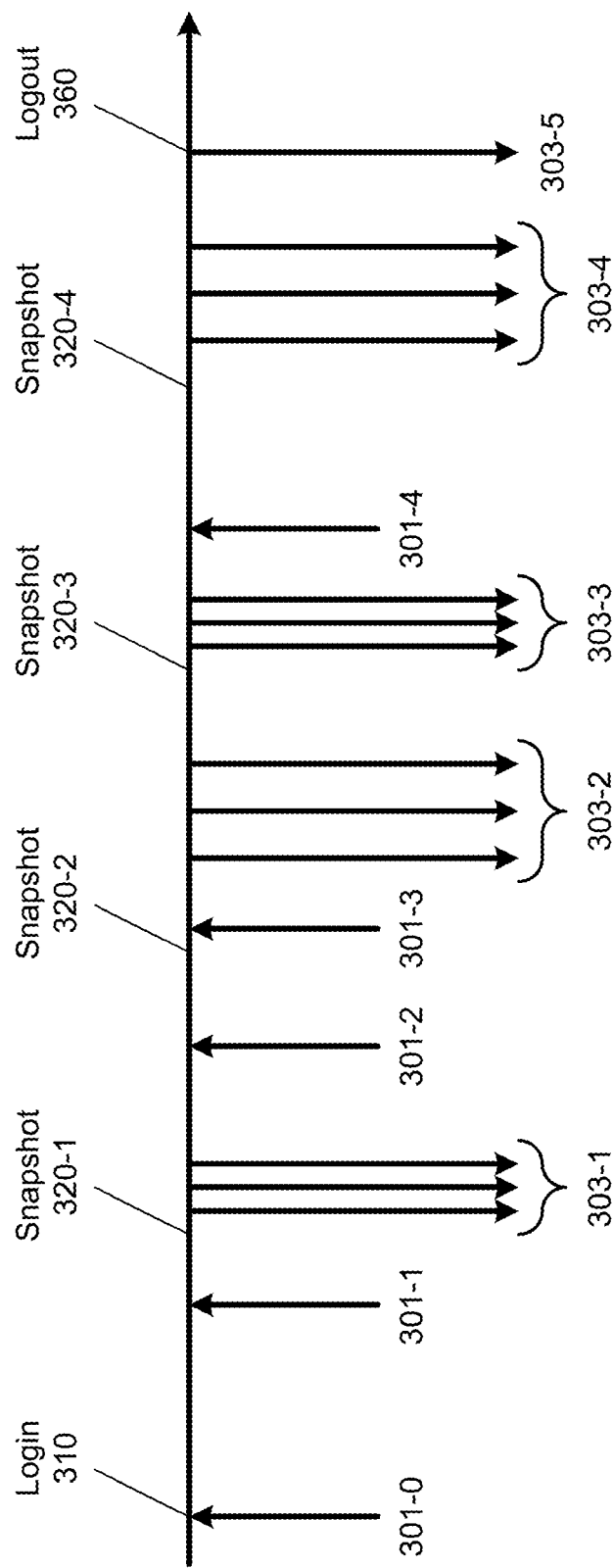
FIG. 3 is a diagram that illustrates the timing of snapshots relative to user profile updates during a remote desktop session.

FIG. 3 is a diagram that illustrates the timing of snapshots relative to user profile updates during a remote desktop session that extends between login 310 and logout 360. In the diagram, an upward arrow (e.g., arrows 301) depicts a user profile loading process by which user profile execution agent 215 loads portions of the user profile from user profile repository 120 into virtual RAM 222, and a downward arrow (e.g., arrows 303) depicts a user profile updating process by which user profile execution agent 215 commits updates to the user profile to user profile repository 120. Snapshots 320 represent snapshots of the persistent image of the user's desktop stored in storage array 112, and are generated at an interval of Δt, which is configurable by a VDI administrator or by a VDI user, when user profile execution agent 215 calls into a snapshot application programming interface exposed by guest OS 214. Some examples of snapshot services that may be used include Volume Snapshot Service (VSS) available on Windows® and Time Machine® available on iOS. Other snapshot services may be used so long as they generate "crash-consistent" snapshots, each of which provides the user with a consistent image of his or her desktop. Thus, after a crash, the user may restore a consistent image of his or her desktop using the most recently generated "crash-consistent" snapshot. It should be understood that each snapshot preserves the state of the desktop image as of the moment of the snapshot with all future writes being redirected to a copy-on-write (COW) cache (which may be implemented as a file), the COW cache retaining a log of all changes to the persistent image of the desktop.

As illustrated in FIG. 3, immediately upon login 310, a first load process depicted by arrow 301-0 is carried out. During the first load process, user profile execution agent 215 loads in metadata of the user profile into virtual RAM 222. In one embodiment, the metadata identifies a monolithic file in which registry settings of the user profile are stored and all other files that are part of the user profile, such as files in the user's "My Documents" folder. Subsequent load processes, depicted by arrows 301-1, 301-2, 301-3, and 301-4, each depict a loading process that is carried out by user profile execution agent 215 to load a file that is part of the user profile and has not yet been loaded into virtual RAM 222 when the user access such a file. In some embodiments, files that are part of the user profile and have not yet been loaded into virtual RAM 222 may be loaded into virtual RAM 222 at different times according to a preset schedule, e.g., after a predetermined amount of time after login 310.

As further illustrated in FIG. 3, user profile execution agent 215 carries out an update process asynchronously with respect to generation of each snapshot 320 and synchronously with respect to logout 360. After each snapshot 320, user profiles execution agent 215 extracts a differential state of the user profile based on the snapshot to create a change log of the user profile. This can be done by examining the copy-on-write cache associated with the snapshot at the time a new snapshot is generated, for changes to registry settings (in one embodiment, changes to the monolithic file of the registry settings) and files of the user profile. Then, user profile execution agent 215 consumes the change log at opportunistic times (e.g., during low activity) to update the user profile stored in user profile repository 120 to reflect changes made to registry settings and files of the user profile. It should be recognized that, if a crash should occur at any point in time between login 310 and logout 360, a crash-consistent user profile can be reconstructed from the user profile stored in user profile repository 120 and the change log, because both are generated from crash-consistent snapshots.

Figure 4:
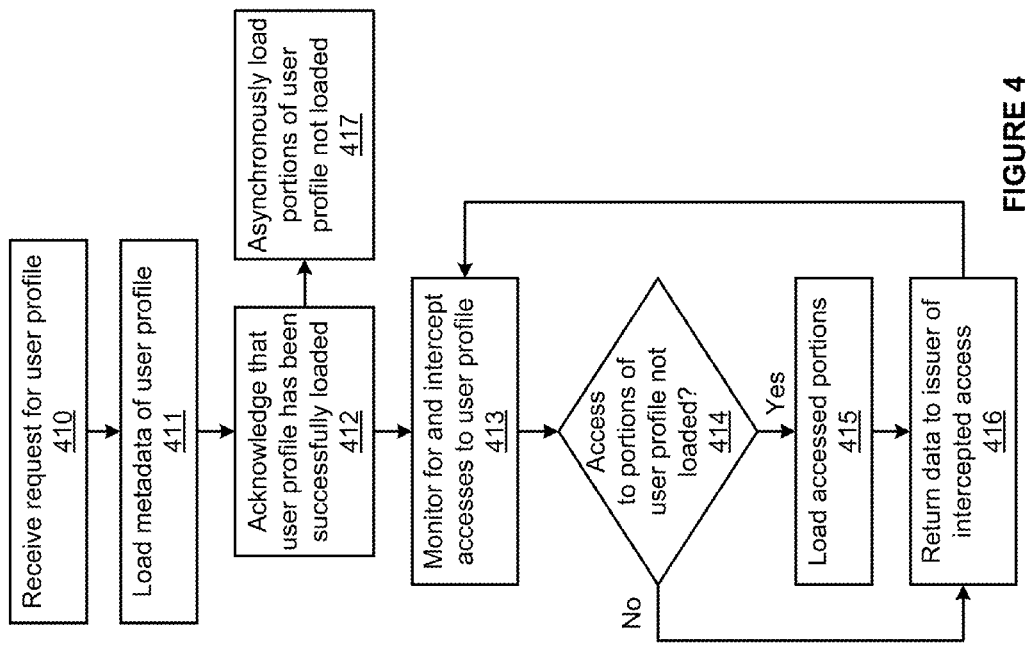
FIG. 4 is a flow diagram that illustrates a user profile loading process upon login.

FIG. 4 is a flow diagram that illustrates a user profile loading process being carried out by user profile execution agent 215 upon login and begins at step 410 with a receipt of a request for loading a user profile. In alternative embodiments, a filter driver may be implemented in lieu of user profile execution agent 215 to perform the functions of user profile execution agent 215 described herein. At step 411, metadata of the user profile are loaded into virtual RAM 222. User profile execution agent 215 also "pretends" to have loaded the entire user profile by acknowledging, in response to the request for loading the user profile, that the entire user profile has been successfully loaded. After the acknowledgement is given at step 412, user profile execution agent 215 spawns parallel threads, one for loading portions of the user profile as they are accessed (steps 413-416) and another for loading portions of the user profile asynchronously (step 417).

At step 413, user profile execution agent 215 monitors accesses to portions of the user profile and intercepts them to determine at step 414 whether or not the portions being accessed have already been loaded. If it is determined at step 414 that such portions have not yet been loaded, step 415 is executed to load the accessed portions into virtual RAM 222. After loading into virtual RAM 222, step 416 is executed where user profile execution agent 215 returns data in the accessed portions to the issuer of the intercepted access. On the other hand, if it is determined at step 414 that the portions of the user profile being accessed have not yet been loaded, step 415 is skipped and step 416 is executed next. After step 416, the thread loops back to step 413, where user profile execution agent 215 monitors for subsequent accesses to the user profile and intercepts them.

Step 417 represents the thread which asynchronously loads portions of the user profile that have not yet been loaded into virtual RAM 222. In one embodiment, the asynchronous loading is carried out according to a preset schedule, after a predetermined amount of time has elapsed after login 310.

Figure 5:
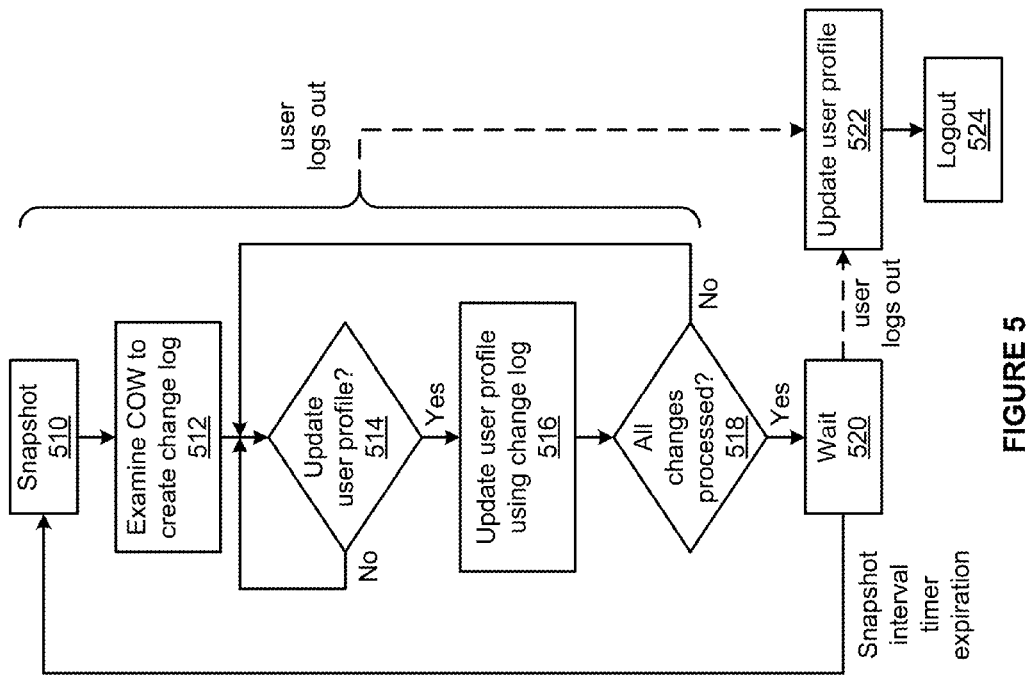
FIG. 5 is a flow diagram that illustrates a user profile update process during a remote desktop session.

FIG. 5 is a flow diagram that illustrates a user profile update process being carried out by user profile execution agent 215 during a remote desktop session. The generation of a snapshot is represented by step 510. As described above, snapshots are generated periodically in accordance with a user-configurable interval by calling into a snapshot application programming interface exposed by guest OS 214. Each time a snapshot is generated, the copy-on-write cache associated with the snapshot is examined at step 512 for changes to the registry settings and files of the user profile since the last snapshot. The changes are recorded in a change log. At step 514, user profile execution agent 215 determines whether the current time is an opportunistic time (e.g., low activity) for committing the changes recorded in the change log to the user profile stored in user profile repository 120. At such an opportunistic time, one or more changes recorded in the change log are committed to the user profile stored in user profile repository 120 at step 516. Steps 514 and 516 are repeated until all changes in the change log are committed to the user profile stored in user profile repository 120. If user profile execution agent 215 determines at step 518 that all changes in the change log are committed to the user profile stored in user profile repository 120, user profile execution agent 215 waits at step 520 until the snapshot interval timer has expired. When the current snapshot interval has expired, the flow returns to step 510 where the snapshot interval timer is reset and another snapshot is generated.

While waiting at step 520 or during any of steps 510, 512, 514, 516, and 518, the user may have initiated a logout process. When this happens, as part of the logout process, user profile execution agent 215 at step 522 finishes consuming any unprocessed changes in the change log. User profile execution agent 215 also examines the copy-on-write cache associated with the snapshot for additional changes to the registry settings and files of the user profile since the last snapshot, and updates the user profile stored in user profile repository 120 to reflect all such changes. The logout is then processed at step 524. If the user terminates his or her desktop session without logging out, a consistent image of the desktop may be constructed upon reconnection using the current version of the user profile stored in user profile repository 120 and consuming the unprocessed changes in the change log.

It should be recognized that various modifications and changes may be made to the specific embodiments described herein without departing from the broader spirit and scope of the invention as set forth in the appended claims. For example, The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of preserving user profiles for desktops across desktop sessions, comprising:
    loading metadata of a user profile from persistent storage when a user logs into a desktop, wherein loading the metadata of the user profile comprises:
        transmitting an acknowledgement that the entire user profile has been successfully loaded prior to the user profile being fully loaded,
        spawning a first thread configured to load portions of the user profile as the portions are accessed by the user, and
        spawning a second thread parallel to the first thread and configured to load portions of the user profile asynchronously according to a schedule;
    generating a snapshot of an image of the desktop stored in persistent storage;
    recording changes to the user profile in a change log using the snapshot; and
    committing the changes to the user profile recorded in the change log to the user profile stored in the persistent storage asynchronously with respect to when the changes to the user profile are recorded in the change log, wherein the changes are committed prior to the user logging out of the desktop.

2. The method of claim 1, further comprising:
    repeating said generating and said recording at periodic intervals; and
    when the user logs out of the desktop, determining changes to the user profile by examining a copy-on-write cache associated with the most recent snapshot and committing the changes to the user profile stored in the persistent storage.

3. The method of claim 2, wherein each snapshot generated is a crash consistent snapshot.

4. The method of claim 2, wherein an interval between generating the snapshots is configurable by the user.

5. The method of claim 1, further comprising:
    examining contents of a copy-on-write cache associated with the snapshot to determine the changes to the user profile since the last snapshot.

6. The method of claim 1, wherein the user profile includes registry settings and files.

7. The method of claim 6, wherein the registry settings are stored as a file.

8. The method of claim 1, further comprising:
    loading registry settings in the user profile asynchronously with respect to when the metadata is loaded.

9. The method of claim 1, wherein the user profile is stored in a shared storage system that is accessible from virtual machines instantiated in any one of multiple host computers that employ the shared storage system as persistent storage.

10. The method of claim 1, wherein the changes to the user profile are determined based on examining a portion of the snapshot representing the user profile.

11. The method of claim 1, wherein the snapshot of the image of the desktop is generated by a guest operating system of the desktop.

12. A non-transitory computer-readable storage medium storing instructions that, when executed by a processor, cause a computing device to preserve user profiles for desktops across desktop sessions, by performing the steps of:
    loading metadata of a user profile from persistent storage when a user logs into a desktop, wherein loading the metadata of the user profile comprises:
        transmitting an acknowledgement that the entire user profile has been successfully loaded prior to the user profile being fully loaded,
        spawning a first thread configured to load portions of the user profile as the portions are accessed by the user, and
        spawning a second thread parallel to the first thread and configured to load portions of the user profile asynchronously according to a schedule;
    generating a snapshot of an image of the desktop stored in persistent storage;
    recording changes to the user profile in a change log using the snapshot; and
    committing the changes to the user profile recorded in the change log to the user profile stored in the persistent storage asynchronously with respect to when the changes to the user profile are recorded in the change log, wherein the changes are committed prior to the user logging out of the desktop.

13. The non-transitory computer-readable storage medium of claim 12, wherein the instructions further comprise instructions that cause the computing device to performing the steps of:
  repeating said generating and said recording at periodic intervals; and
  when the user logs out of the desktop, determining changes to the user profile by examining a copy-on-write cache associated with the most recent snapshot and committing the changes to the user profile stored in the persistent storage.

14. The non-transitory computer-readable storage medium of claim 12, wherein the instructions further comprise instructions that cause the computing device to performing the steps of:
  examining contents of a copy-on-write cache associated with the snapshot to determine the changes to the user profile since the last snapshot, wherein the user profile includes registry settings stored as a file.

15. The non-transitory computer-readable storage medium of claim 12, wherein the instructions further comprise instructions that cause the computing device to performing the steps of:
  loading registry settings in the user profile asynchronously with respect to when the metadata is loaded.

16. A computer system comprising:
  a plurality of servers configured to host desktops that can be remotely accessed by users;
  a persistent storage device shared by the plurality of servers and storing an image of the first desktop and a user profile associated with a first desktop, wherein the first desktop is hosted on a virtual machine that is running in one of the servers and the virtual machine is programmed to carry out the steps of:
  loading metadata of the user profile from the persistent storage device when a user logs into the first desktop, wherein loading the metadata of the user profile comprises:
    transmitting an acknowledgement that the entire user profile has been successfully loaded prior to the user profile being fully loaded;
    spawning a first thread configured to load portions of the user profile as the portions are accessed by the user; and
    spawning a second thread parallel to the first thread and configured to load portions of the user profile asynchronously according to a schedule,
  generating a snapshot of an image of the first desktop stored in the persistent storage device,
  recording changes to the user profile in a change log using the snapshot, and
  committing the changes to the user profile recorded in the change log to the user profile stored in the persistent storage device asynchronously with respect to when the changes to the user profile are recorded in the change log, wherein the changes are committed prior to the user logging out of the desktop.

17. The computer system of claim 16, wherein the virtual machine is further programmed to carry out the steps of:
  repeating said generating and said recording at periodic intervals; and
  when the user logs out of the first desktop, determining changes to the user profile by examining a copy-on-write cache associated with the most recent snapshot and committing the changes to the user profile stored in the persistent storage.

18. The computer system of claim 16, wherein the virtual machine is further programmed to carry out the steps of:
  examining contents of a copy-on-write cache associated with the snapshot to determine the changes to the user profile since the last snapshot, wherein the user profile includes registry settings stored as a file.

19. The computer system of claim 16, wherein the virtual machine is further programmed to carry out the steps of:
  loading registry settings in the user profile asynchronously with respect to when the metadata is loaded.

* * * * *